(12) United States Patent
Talda et al.

(10) Patent No.: US 10,773,839 B1
(45) Date of Patent: Sep. 15, 2020

(54) METHODS FOR PACKAGING ITEMS AND PREPARING PACKAGING MATERIALS

(71) Applicant: Amazon Technologies, Inc., Seattle, WA (US)

(72) Inventors: Timothy Alan Talda, Seattle, WA (US); Brian Hoffman, Seattle, WA (US); Paul Roy Raines, Jr., Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 255 days.

(21) Appl. No.: 15/891,600

(22) Filed: Feb. 8, 2018

(51) Int. Cl.
*B65B 9/06* (2012.01)
*B25J 13/08* (2006.01)
*B65B 51/16* (2006.01)
*B65D 75/38* (2006.01)
*B65D 81/03* (2006.01)
(Continued)

(52) U.S. Cl.
CPC ............ *B65B 9/06* (2013.01); *B25J 13/08* (2013.01); *B31D 5/0065* (2013.01); *B31D 5/0069* (2013.01); *B65B 51/16* (2013.01); *B65D 75/26* (2013.01); *B65D 75/38* (2013.01); *B65D 81/03* (2013.01); *B65D 2303/00* (2013.01); *B65D 2575/3272* (2013.01)

(58) Field of Classification Search
CPC .. B65B 9/00; B65B 9/06; B65B 9/067; B65B 9/08; B65B 9/10; B65B 39/12; B65B 47/04; B31D 5/0065; B31D 5/0069; B31B 2155/0014
USPC ......... 53/449, 450, 455, 140, 141, 172, 545, 53/548, 550, 562, 574, 575
See application file for complete search history.

(56) References Cited

U.S. PATENT DOCUMENTS 2,962,158 A 11/1960 Struthers
3,303,629 A * 2/1967 Tobin ..................... B65B 51/16
53/562
(Continued)

FOREIGN PATENT DOCUMENTS

JP 01294465 A * 11/1989
WO WO 97/03816 A1 2/1997
WO WO 00/05149 A2 2/2000

OTHER PUBLICATIONS

U.S. Appl. No. 15/655,318, filed Jul. 20, 2017, Hoffman et al.
(Continued)

*Primary Examiner* — Stephen F. Gerrity
(74) *Attorney, Agent, or Firm* — BakerHostetler

(57) ABSTRACT

A method of preparing a packaging laminate includes conveying a mesh of paper material having perforations against a rigid edge causing, at substantially each perforation, a mesh portion at the leading side to have an average elevation lower than that of a mesh portion on the trailing side of the perforation. The method includes expanding the perforations into cells separated from one another by legs interconnected by nodes defined in the mesh Top and bottom surfaces of the legs and nodes are reoriented from an initial orientation substantially parallel with a direction of conveyance of the mesh to an expanded orientation oblique to the direction of conveyance, such that, in the expanded orientation, the top surfaces of the nodes are substantially parallel with each other. The method includes attaching an outer liner to at least some of the bottom surfaces so as to form the packaging laminate.

20 Claims, 9 Drawing Sheets

(51) Int. Cl.
  *B65D 75/26* (2006.01)
  *B31D 5/00* (2017.01)

(56) References Cited

U.S. PATENT DOCUMENTS

| | | | |
|---|---|---|---|
| 3,762,629 | A | 10/1973 | Bruno |
| 3,867,874 | A | 2/1975 | O'Neil |
| 3,906,128 | A | 9/1975 | Burling et al. |
| 4,011,798 | A | 3/1977 | Bambara et al. |
| 4,087,002 | A | 5/1978 | Bambara et al. |
| 4,105,724 | A * | 8/1978 | Talbot .................. B01J 19/30 261/112.1 |
| 4,253,892 | A | 3/1981 | D'Angelo et al. |
| 4,265,956 | A | 5/1981 | Colijn |
| 4,297,154 | A * | 10/1981 | Keller .................. B21D 31/043 156/79 |
| 4,832,228 | A * | 5/1989 | Hickey ................. A01K 31/007 119/174 |
| 4,921,118 | A * | 5/1990 | Gass .................... B21D 31/046 220/88.1 |
| 5,030,501 | A | 7/1991 | Colvin et al. |
| 5,207,020 | A * | 5/1993 | Aslam et al. .......... C09K 17/52 47/9 |
| 5,667,871 | A * | 9/1997 | Goodrich et al. ... B31D 5/0065 206/521 |
| 6,089,325 | A * | 7/2000 | Yassin Alhamad ...... A62C 3/06 169/46 |
| 6,898,922 | B2 * | 5/2005 | Reist ..................... B65B 5/022 270/52.19 |
| 8,919,689 | B2 * | 12/2014 | Kuchar et al. ....... B65H 23/022 242/580.1 |
| 9,586,747 | B2 | 3/2017 | Zhang |
| 9,649,823 | B2 | 5/2017 | Prud'homme et al. |
| 9,827,711 | B2 | 11/2017 | Wetsch et al. |
| 10,002,692 | B2 * | 6/2018 | Czyzewski et al. ...... B26F 1/20 |
| 10,301,121 | B1 * | 5/2019 | Hoffman et al. ...... B65D 27/00 |
| 2004/0000581 | A1 | 1/2004 | Brandolini et al. |
| 2008/0020188 | A1 | 1/2008 | Gale |
| 2015/0314936 | A1 * | 11/2015 | Stack, Jr. ............... B65D 81/07 206/488 |
| 2016/0067938 | A1 | 3/2016 | Goodrich |
| 2017/0203866 | A1 * | 7/2017 | Goodrich ............ B31D 5/0069 |
| 2018/0370702 | A1 * | 12/2018 | Goodrich ............ B65D 81/03 |
| 2019/0100369 | A1 * | 4/2019 | Hoffman et al. ...... B65D 81/03 |

OTHER PUBLICATIONS

U.S. Appl. No. 15/720,538, filed Sep. 29, 2017, Hoffman et al.
U.S. Appl. No. 16/147,073, filed Sep. 28, 2018, Hoffman.
U.S. Appl. No. 15/919,904, filed Mar. 13, 2018, Hoffman et al.
U.S. Appl. No. 16/147,160, filed Sep. 28, 2018, Hoffman.
International Patent Application No. PCT/US2018/053372; Int'l Search Report and the Written Opinion; dated Nov. 30, 2018; 13 pages.

* cited by examiner

METHODS FOR PACKAGING ITEMS AND PREPARING PACKAGING MATERIALS

BACKGROUND

In an order fulfilment center, automated induction of random items into flexible packaging, such as flexible envelopes, for the shipment and/or delivery of single-item or multi-item orders presents significant challenges. These challenges are compounded in fulfillment centers that process items of varying sizes and shapes. In current automated packaging systems, if the package is preformed, then items often end up in unfavorable or otherwise unorganized orientations, and can even become "stuck" in the package, particularly if numerous items are inducted into the package. This problem is particularly prevalent when items are inducted into the package via gravity, and significant efforts to reposition items in the package are often required. Moreover, for automated flexible packaging systems, any translation of the combined items and internal padding material while moving this combination to a position to create the flexible package around the combination can cause the items to shift, resulting in interference with the formation of the package. Additionally, certain padding materials within the package, such as paper meshes, exhibit diminished cushioning qualities when the constituent components of the mesh or not oriented in a uniform manner.

BRIEF DESCRIPTION OF THE DRAWINGS

The following detailed description will be better understood when read in conjunction with the appended drawings, in which there is shown in the drawings example embodiments for the purposes of illustration. It should be understood, however, that the present disclosure is not limited to the precise arrangements and instrumentalities shown. In the drawings.

DETAILED DESCRIPTION

The embodiments disclosed herein pertain to an autonomous packaging system that assembles a flexible packaging laminate having a cushion layer and delivers the laminate to an induction zone, while items to be packaged are concurrently delivered to the induction zone. At the induction zone, item(s) are inducted into a clamshell bucket that depresses the laminate in a conformal manner to define a volume in the laminate that closely approximates the volume of the organized item(s) and thereafter deposits the item(s) within the conformed laminate while maintaining the organization of the item(s).

Figure 1:
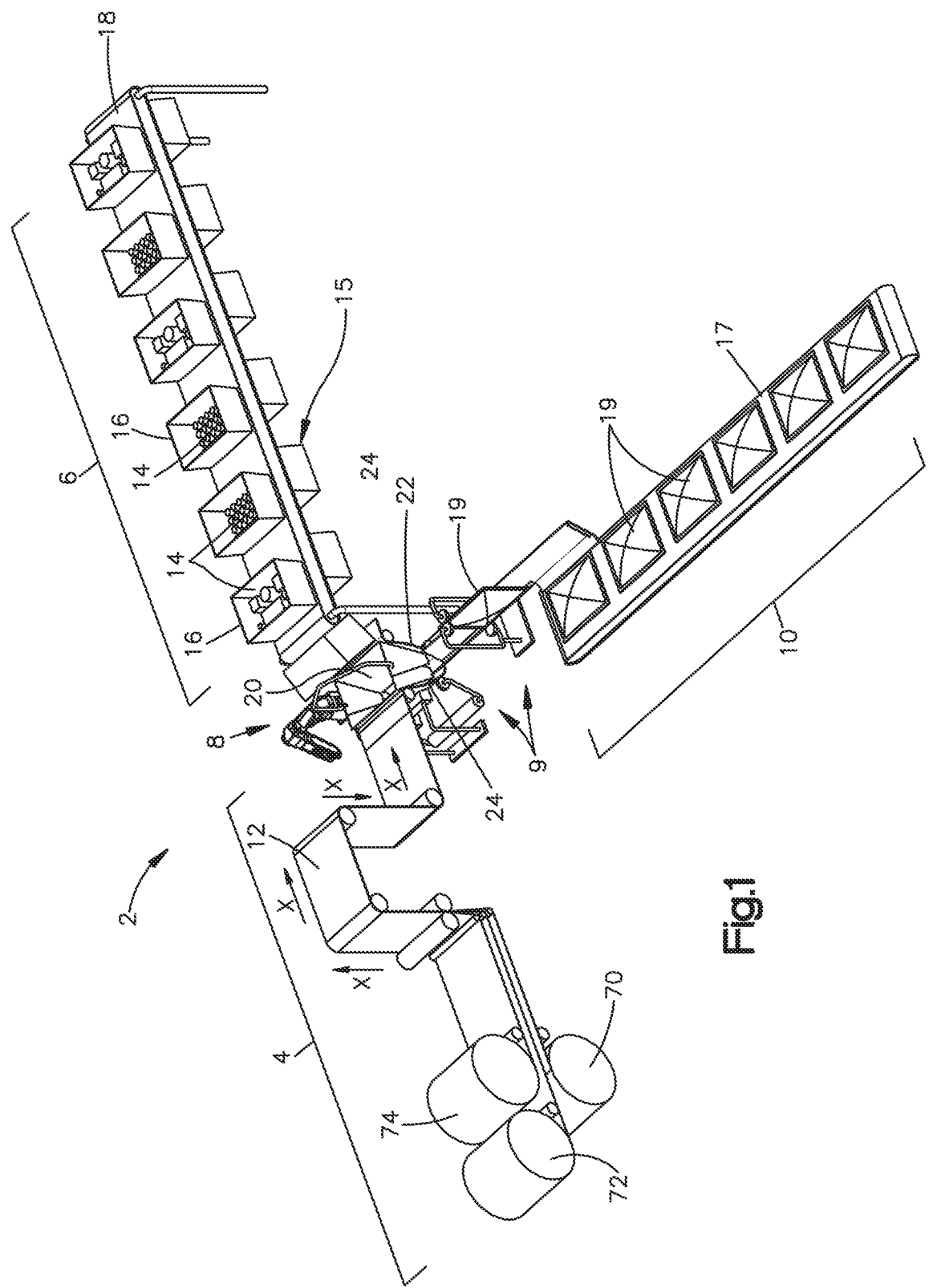
FIG. 1 shows a perspective view of an automated packaging system, according to an embodiment of the present disclosure.

Referring to FIG. 1, an automated packaging system 2 includes a package material supply zone 4, an item supply zone 6, a packaging induction zone 8 (also referred to herein as the "induction zone"), a package sealing zone 9, and a package offload zone 10. The packaging system 2 can be employed to package single items 14 or multiple items in a single package. In the package material supply zone 4, packaging materials, including a laminate layer 12 of packaging material, is conveyed to the induction zone 8 in a direction of conveyance X. The laminate layer 12 can include a cushion or padding layer, as set forth in more detail below. The laminate layer 12 is also referred to herein as a "packaging laminate," a "laminate," a "belt of cushioned packaging material," or simply a "belt." The laminate 12 can be assembled, or at least partially assembled, or otherwise prepared for conveyance, within the package material supply zone 4, as described in more detail below. It is to be appreciated that the direction of conveyance X refers to the direction at which any portion of the laminate 12 is conveyed and can change depending upon where such portion of the laminate 12 is located within the packaging system 2.

In the item supply zone 6, incoming orders of items 14 can be segregated into containers 16 that are conveyed to the induction zone 8 for packaging. As shown, the containers 16 can be totes that are placed on or coupled to a mechanical conveyor line 18, such as an automated conveyor belt, that delivers the containers 16 to the induction zone 8. For multi-item 14 orders, the items 14 thereof can be grouped into a single container 16 or into a plurality of sequential containers 16 on the conveyor belt 18. The conveyor belt 18 can include a return portion 15, such as on the underside of the conveyor belt 18, for example, for returning the emptied containers 16 to a location for receiving additional items 14. In other embodiments, a separate takeaway conveyor can be configured to receive the emptied containers 16 and return them to a location for receiving additional items 14.

In the induction zone 8, the laminate 12 is manipulated into a package 19 surrounding and enclosing the item(s) 14 therein. Thereafter, the package 19 is then sealed (or at least partially sealed) within the sealing zone 9 and subsequently sent to the offloading zone 10, wherein the packages 19 can be deposited onto one or more mechanical conveyor lines 17 configured to convey the packages 19 toward a subsequent destination within the fulfilment center, such as a package sorting destination. In the illustrated embodiment, the packages 19 are padded envelopes, also referred to as "mailers" or "jiffy mailers"; however, other types of flexible, conformal packages 19 are within the scope of the present disclosure.

Figure 2:
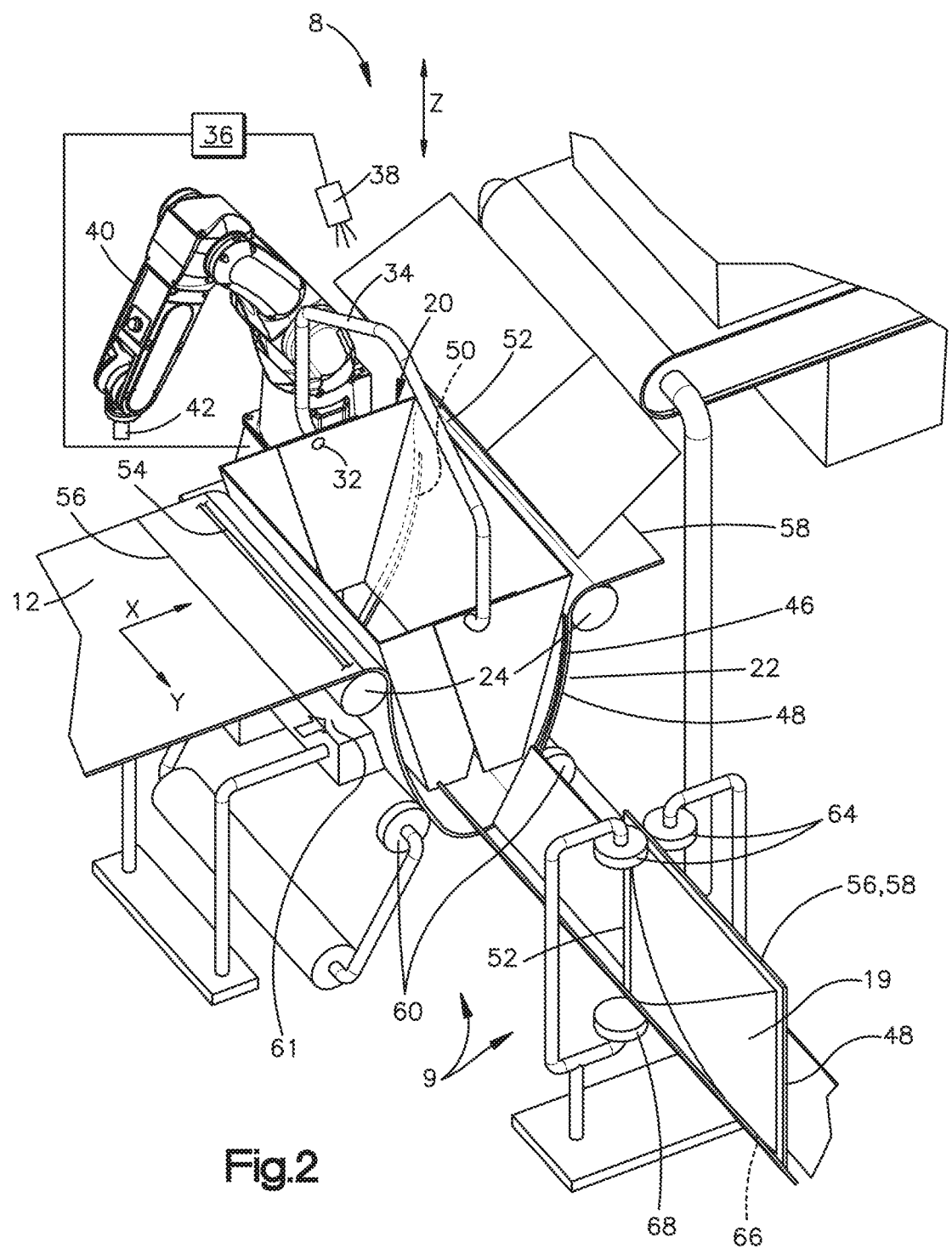
FIG. 2 shows an enlarged view of an induction zone of the automated packaging system of FIG. 1.

Referring now to FIG. 2, the induction zone 8 includes a bucket 20 that is movable at least along a vertical direction Z with respect to the laminate 12 for facilitating the insertion of item(s) 14 into a package segment 22 defined by the laminate 12. In the induction zone 8, the laminate 12 can be pulled across a pair of brace rollers 24 so as to define the package segment 22. The bucket 20 can be lowered to depress the package segment 22 to a predetermined distance below the brace rollers 24, which distance can be predetermined according to an approximated total volume of the item(s) 14 to be packaged in the package segment 22. In FIG. 1, the bucket 20 is shown substantially at its maximum depressed position with respect to the package segment 22. As shown, the bucket 20 can depress the package segment 22 to the predetermined distance before item(s) 14 are indicted into the bucket 20 from the container(s) 16. However, it is to be appreciated that some or all of the item(s) 14 can be inducted into the bucket 20 before the bucket 20 depresses the package segment 22.

The bucket 20 is configured to pre-organize the item(s) 14 or at least a subset of item(s) of a customer order into an approximated final shape of the package 19 to be formed from the packaging segment 22. As the bucket 20 is lowered over the package segment 22, the package segment 22 conforms substantially around a periphery of the bucket 20. The bucket 20 has a bottom opening 26 that can be adjusted between a fully closed position and a fully open position. After the bucket 20 depresses the package segment 22 to the predetermined distance, the bottom opening 26 can be opened, releasing the item(s) 14 into the substantially conformally folded package segment 22. The bucket 20 can be configured to be retracted upwards with minimal disruption to the volume and orientation of the item(s) 14 in the package segment 22, which remains folded in substantially conformal fashion around the item(s) 14. In the illustrated embodiment, the bucket 20 is a "clamshell" bucket that includes first and second portions 28, 30 extending vertically from the top open end of the bucket to the bottom opening 26. The bucket portions 28, 30 are coupled together at a hinge joint 32, which can be manipulated to pivot the bucket portions 28, 30 with respect to one another to cause the bottom opening 26 to move between the fully closed and fully opened positions. The bucket portions 28, 30 can be tapered such that, when the bottom opening 26 is fully closed, the bucket portions 28, 30 funnel item(s) 14 via gravity to the bottom opening 26. The bucket 20 can include a support arm 34 that is attachable to a mechanism for raising and lowering the bucket 20. As shown, the support arm 34 can define the hinge joint 32. It is to be appreciated that the bucket 20 preferably defines a maximum width less than that of the laminate 12 along a lateral direction Y that is perpendicular to the direction of conveyance X and the vertical direction Z. Thus, the package segment 22 has sufficient lateral space so that the lateral edges thereof can be sealed without interfering with the item(s) 14, as discussed in more detail below. It is to be appreciated that other bucket 20 designs are within the scope of the present disclosure. For example, the bucket 20 can be configured according to any of the embodiments described in U.S. patent application Ser. No. 15/655,318, filed on Jul. 20, 2017, in the name of Hoffman et al., now U.S. Pat. No. 10,301,121, the entire disclosure of which is incorporated by reference herein.

Referring again to FIG. 2, in operation, item(s) 14 are inducted into the bucket 20 from one or more of the containers 16. The clamshell design enables item(s) 14 inducted into the bucket 20 to become oriented via gravity and motion into a volume that approximates a final shape of the package 19. The bucket-moving mechanism can also be configured to jostle, shake, vibrate, or otherwise move the bucket 20 in a manner causing the item(s) 14 to be packed against the closed bottom opening 26, thus reducing the approximate package volume. It is to be appreciated that the approximate package volume is a parameter (preferably the main parameter) used to calculate the predetermined distance by which the bucket 20 depresses the package segment 22. The approximate package volume, as well as the predetermined distance, can be calculated by a control unit 36 in electronic communication with the bucket-moving mechanism. The volume can be calculated, at least in part, based on data received from a sensor 38 that is configured to sense item(s) 14 in the bucket 20. For example, the data can include one or more images generated by an image sensor 38 in electronic communication with the control unit 36. It is to be appreciated that the sensor 38 can optionally be located elsewhere in the packaging system 2, such as upstream within the item supply zone 6, for example. In such embodiments, the image sensor 38 can be configured to identify items 14 that have a higher probability than others of jamming within the bucket 20, based on for example, their orientation within the respective container(s) 16. In other embodiments, the image sensor 38 can be a scanner, such as a barcode reader or other type of stock keeping unit (SKU) image reader, for example, configured to read an identification tag or label carried by each item 14. In such embodiments, the dimensions of each item 14 can be stored in memory accessible by the control unit 36. It is to be appreciated that the sensor 38 can optionally be located elsewhere in the packaging system 2, such as even further upstream, such as at an inventory stage of the items or at an intermediate stage, for example.

The control unit 36 can also be in electronic communication with a robotic arm 40 positioned in the induction zone 8. The robotic arm 40 is configured to reposition item(s) 14 as desired. For example, the robotic arm 40 can be configured to grasp item(s) 14 that inadvertently fall outside the bucket 20, such as into the sealing zone 9, and deposit such item(s) 14 into the bucket 20. The robotic arm 40 can also be configured to reposition item(s) 14 within the bucket 20 into a more favorable orientation and/or position within the bucket 20 (such as to minimize the approximate package volume). The control unit 36 can operate the robotic arm 40 autonomously based on data received from one or more sensors, such as image data received from the image sensor 38.

With continued reference to FIG. 2, the packaging system 2 can include one or more applicators 42 for applying adhesive to edges of the package segment 22 for subsequent sealing of the item(s) 14 therein. The applicator 42 can apply the adhesive to each package segment 22 that enters the induction zone 8 before the bucket 20 is lowered onto the package segment 22. The robotic arm 40 can carry the applicator 42, as shown. In other embodiments, the applicator 42 can be carried by a separate robotic arm, or by other mechanisms for applying adhesive. For example, the applicator can optionally include a mechanism employing repeated motion to apply adhesive to the same spot. Such mechanisms can include a linear actuator (having a dispensing roller, for example), a pneumatic dispenser, a spray nozzle, and a fixed roller positioned alongside the laminate 12, by way of non-limiting examples. Moreover, the applicator can optionally deposit a continuous bead of adhesive liquid along the lateral edges of the laminate 12. In further embodiments, the laminate 12 can include a layer of polymeric material and the applicator 42 can be configured for ultrasonic and/or thermal sealing (e.g., welding) of one or more portions of the laminate 12.

The applicator 42 can be configured to apply one or more layers of adhesive to an outer surface 44 of the laminate 12 within the package segment 22. For example, the applicator 42 can apply a first adhesive layer 46 to a first lateral edge 48 of the laminate 12 and a second adhesive layer 50 to a second lateral edge 52 of the laminate 12. The first and second adhesive layers 46, 50 can be elongate along the direction of conveyance X. The applicator 42 can also apply a third adhesive layer 54 to the laminate 12 along the lateral direction Y. Although the third adhesive layer 54 is shown applied to a trailing edge 56 of the package segment 22 with respect to the direction of conveyance X, the third adhesive layer 54 can optionally be applied to a leading edge 58 of the package segment 22. In additional embodiments, the third adhesive layer 54 and an additional adhesive layer can be applied to the leading and trailing edges 58, 56 of the package segment 22. The adhesive layers 46, 50, 54 can optionally be applied to the laminate 12 at such locations so as to avoid contact with the bucket 20. The adhesive layers 46, 50, 54 can be include adhesive spray, double-sided adhesive strips, a thermoplastic (such as a low-density polyethylene (LDPE) or a high-density polyethylene (HDPE), by way of non-limiting examples), adhesive cords, pressure-sensitive adhesive, heat-activated or other type of energy-activated adhesive, or any combination of the foregoing. It is to be appreciated that other types of adhesives are within the scope of the present disclosure. It is also to be appreciated that different types of applicators 42 can be employed to apply the foregoing types of adhesives to the laminate 12.

The packaging system 2 can include a plurality of sealing elements for sealing edges of the package segment 22. As shown, the sealing elements can include a plurality of rollers 60, 62, 64, 68 configured to press the edges of the package segment 22 together, forcing the adhesive layers into sealing engagement with opposed portions of the package segment 22. The rollers can include a first pair of opposed rollers 60 positioned at the first lateral edge 48 of the package segment 22 and a second pair 62 of opposed rollers (not visible in FIG. 2) positioned in like manner at the second lateral edge 50 of the package segment 22. After the item(s) 14 are deposited into the package segment 22 and the bucket 20 is retracted, the first pair of opposed rollers 60 can press the first adhesive layer 46 against the opposed portion of the first lateral edge 48, and the second pair of opposed rollers can press the second adhesive layer 54 against the opposed portion of the second lateral edge 52 in a manner sealing the lateral edges 48, 52 of the package segment 22.

The packaging system 2 can include a severing device, such as a translatable blade 61, that is configured to cut the trailing edge 56 of the package segment 22, severing the package 19 from the bulk of the laminate 12. The blade 61 can sever the package 19 before, during, or after the lateral edges 48, 52 are sealed. Thereafter, the package segment 22 can be translated along the lateral direction Y so that the leading and trailing edges 58, 56 (collectively defining a top edge of the package) pass between a third pair of opposed rollers 64 that pressed the third adhesive layer 54 against the opposed portion of the top edge of the package 19. A bottom edge 66 of the package can be directed through a fourth pair of opposed rollers 68 so as to form a crease at the bottom edge 66. It is to be appreciated that, in other embodiments, other types of sealing elements can be employed to seal the edges of the package 19, including bars, plates, and crimpers, by way of non-limiting examples. The system 2 can also include a mechanism for automatically applying a shipping label to the package 19, which can be applied before or after the bottom 66 and top edges 56, 58 of the package 19 are sealed.

Figure 11:
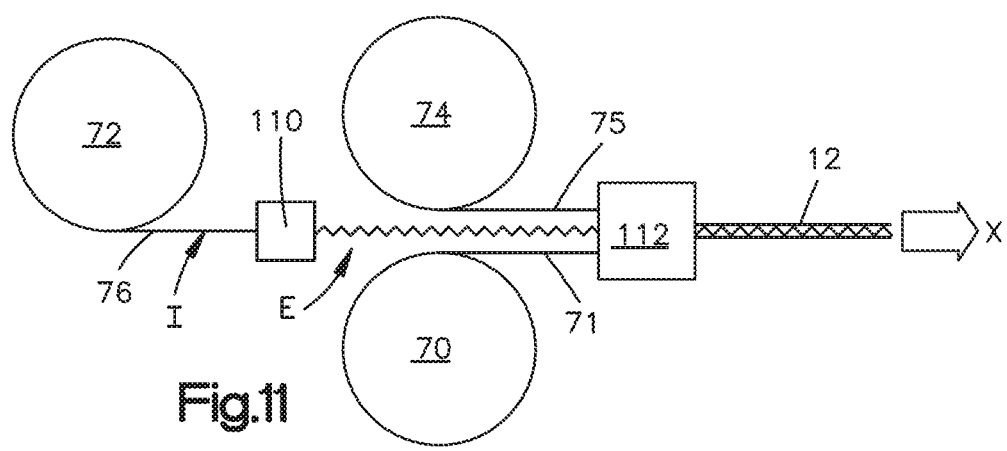
FIG. 11 shows a side plan view of a sub-assembly for preparing a laminated packaging material for use with the automated packaging system of FIG. 1, according to an embodiment of the present disclosure.

Referring again to FIG. 1, the laminate 12 can be assembled from a plurality of layers of material, which layers can be individually supplied on spools (i.e., rolls) of material. The rolls can include a first or bottom roll 70, a second or center roll 72, and a third or top roll 74. The bottom and top rolls 70, 74 can include a packaging liner material (also referred to herein as a "liner layer" or simply a "liner"). The bottom roll 70 can include a first liner 71, the top roll 74 can include a second liner 75, and the center roll 72 can include a cushion layer 73 to be sandwiched between the first and second liners 71, 75, as shown in FIG. 11. In this manner, the liners 71, 75 and the cushion layer 73 comprise the laminate 12 which is conveyed, such as by rollers, to the induction zone 8. Each of the liners 71, 75 is preferably a paper-based liner, such as kraft paper, for example, although other packaging liner materials are within the scope of the present embodiments. In the illustrated packaging system 2, the top liner 75 forms an interior of the packages 19 while the bottom liner 71 forms an exterior of the packages 19; thus, the top liner 71 can be referred to as the "inner liner" while the bottom liner 75 can be referred to as the "outer liner."

Figure 3:
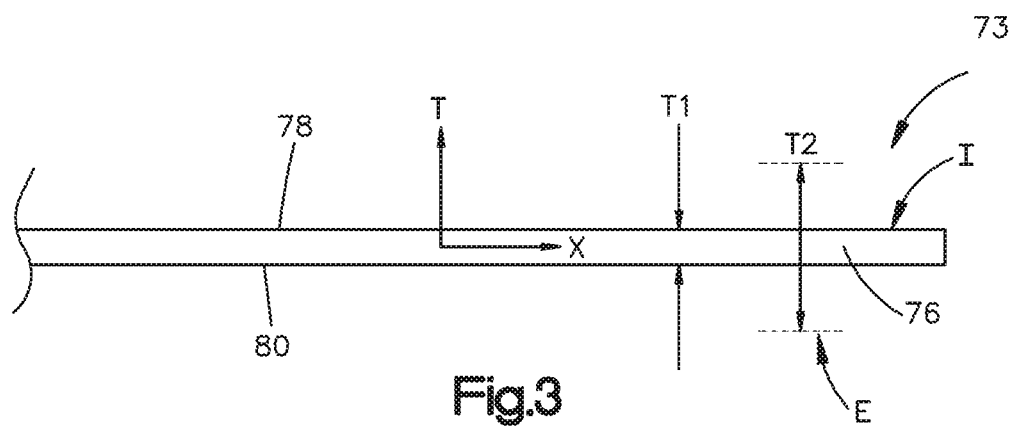
FIG. 3 shows a side view of a cushion layer for a packaging material employed by the automated packaging system of FIG. 1, according to an embodiment of the present disclosure, wherein the cushion layer is a paper mesh.

Referring now to FIG. 3, the cushion layer 73 can comprise a paper-based cushion material, such as an expandable paper mesh 76 (also referred to herein as "the mesh"). The mesh 76 can be formed of kraft paper, although other types of paper and non-paper packaging materials can be employed. Preferably, the liners 71, 75 and the mesh 73 each comprise kraft paper. The mesh 76 is elongate along the direction of conveyance X. The mesh 76 defines a first or top surface 78, a second or bottom surface 80, and an initial thickness T1 measured between the top and bottom surfaces 78, 80 along a transverse direction T that is perpendicular to the direction of conveyance X. The mesh 76 can be configured to expand transversely from an initial mesh configuration I, in which the mesh 76 is at the initial thickness T1, to an expanded mesh configuration E, in which the mesh 76 defines an expanded thickness T2 that is greater than the initial thickness T1.

It is to be appreciated that the cushion layer 73 can include materials other than paper-based materials. By way of non-limiting example, the cushion layer 73 can include an expandable adhesive that can be printed onto one or both of the liners 71, 75 in an unexpanded configuration and can be subsequently expanded into a cushioning configuration responsive to an activation energy source, such as thermal energy, microwaves, or other types of energy sources.

Figure 4:
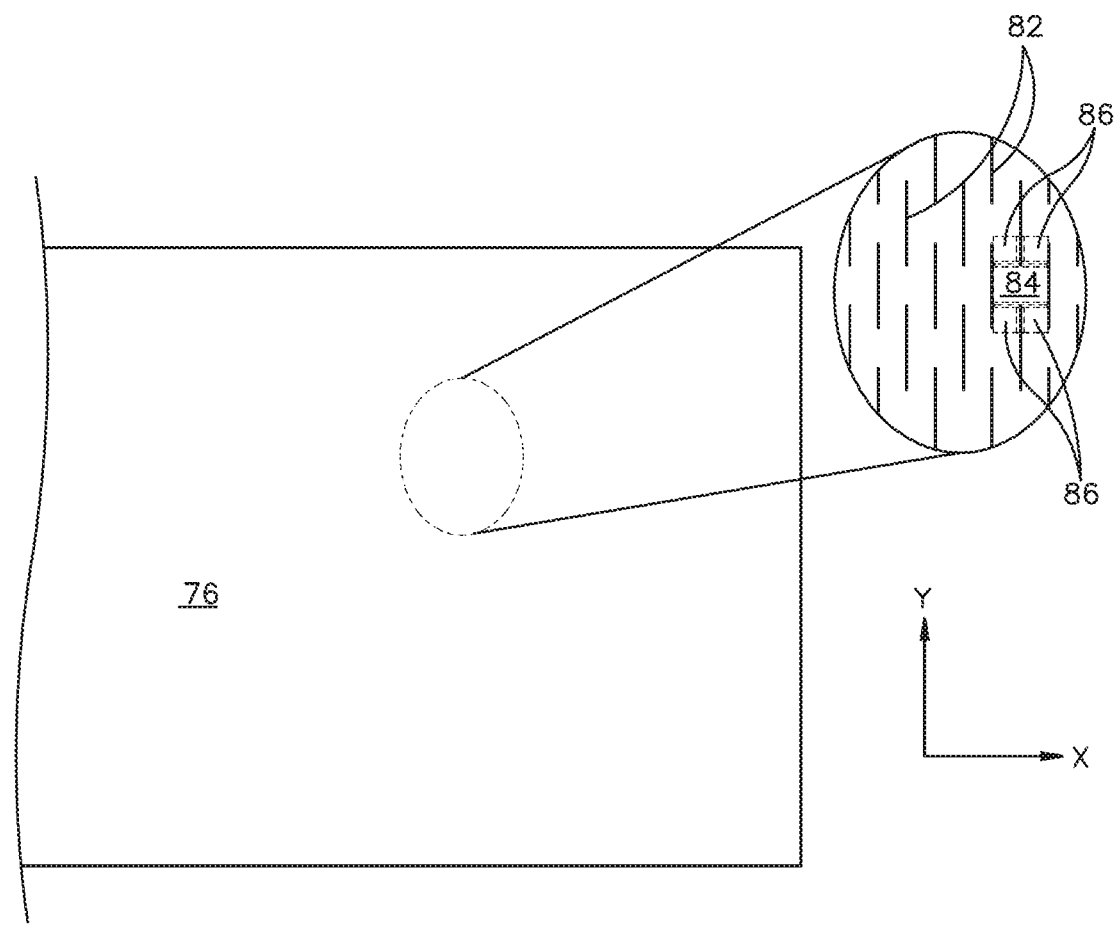
FIG. 4 shows a top plan view of the paper mesh of FIG. 3, also showing a magnified view of perforations formed in the mesh, according to an embodiment of the present disclosure.

Referring now to FIG. 4, the mesh 76 can include an array of perforations 82 formed into the paper, such as by cutting. In the illustrated embodiment, each of the perforations can be elongate along the lateral direction Y. The perforations 82 in the array are staggered so that the mesh 76 defines nodes 84 interconnected by a plurality of legs 86. In the illustrated embodiment, each node 84 (except those at the periphery of the mesh 76) has four (4) legs extending therefrom. Each leg 86 connects one node 84 to another node. Legs 86 located at the periphery of the mesh 76 may be "free-hanging" so as to only be connected to a single node 84. It is to be appreciated that the top and bottom surfaces 78, 80 of the mesh 76 define the collective top and bottom surfaces of each of the nodes 84 and legs 86. When the mesh 76 is in the initial configuration I, the top and bottom surfaces 78, 80 of the nodes 84 and legs 86 in an initial orientation in which the top and bottom surfaces 78, 80 are substantially parallel with the direction of conveyance X.

Figure 5:
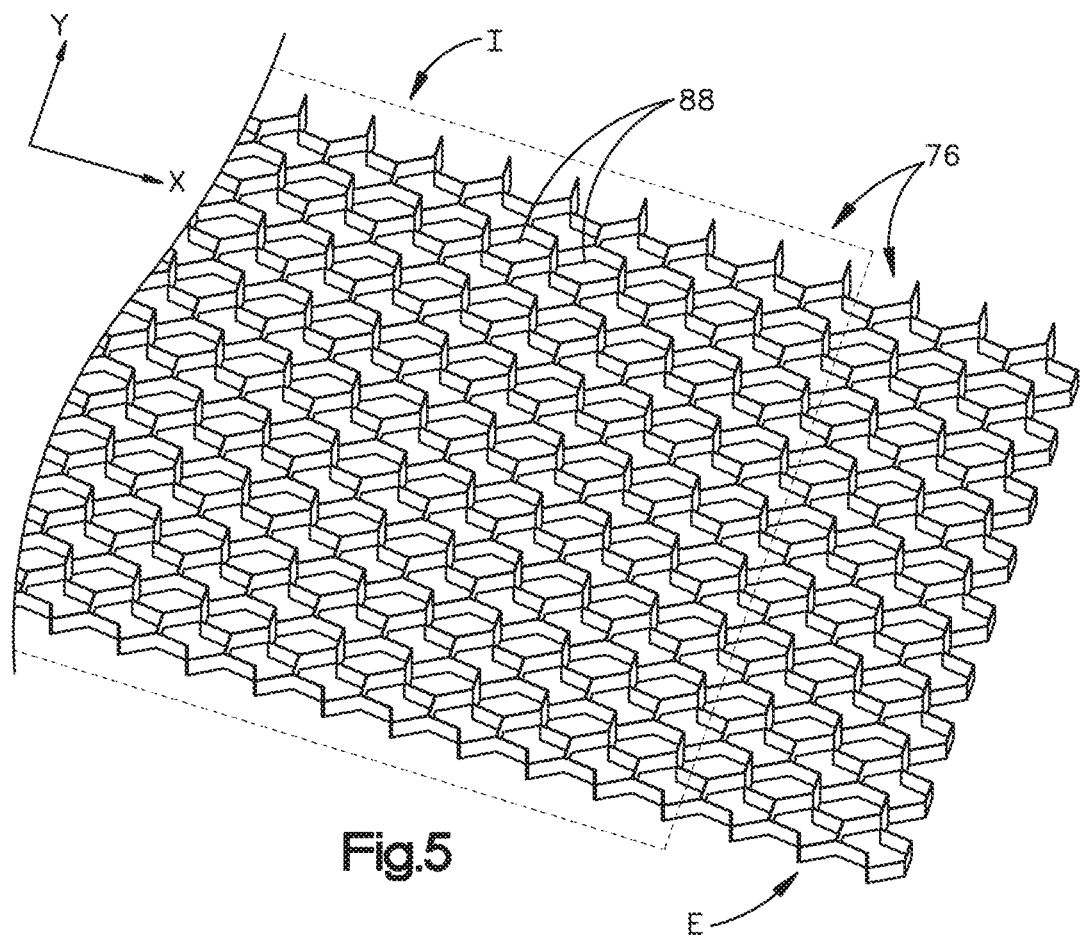
FIG. 5 shows a perspective view of a length of the mesh of FIG. 4 in a substantially uniform expanded configuration.

Referring now to FIG. 5, the perforations 82 are organized in a substantially uniform manner so that the perforations 82 expand into hexagonal cells 88 when sufficient tension is applied to the mesh 76 along the direction of conveyance X. This expansion of the perforations 82 causes the mesh 76 to likewise expand along the direction of conveyance X. In the expanded configuration E, the mesh 76 assumes a honeycomb-like structure. Expansion of the mesh 76 along the direction of conveyance X can also cause the mesh 76 to contract slightly along the lateral direction Y. The mesh 76 can be configured similarly to that disclosed in U.S. Patent Publication No. 2019/01009369 A1, published Apr. 4, 2019, in the name of Hoffman et al., the entire disclosure of which is incorporated by reference herein.

Figure 6:
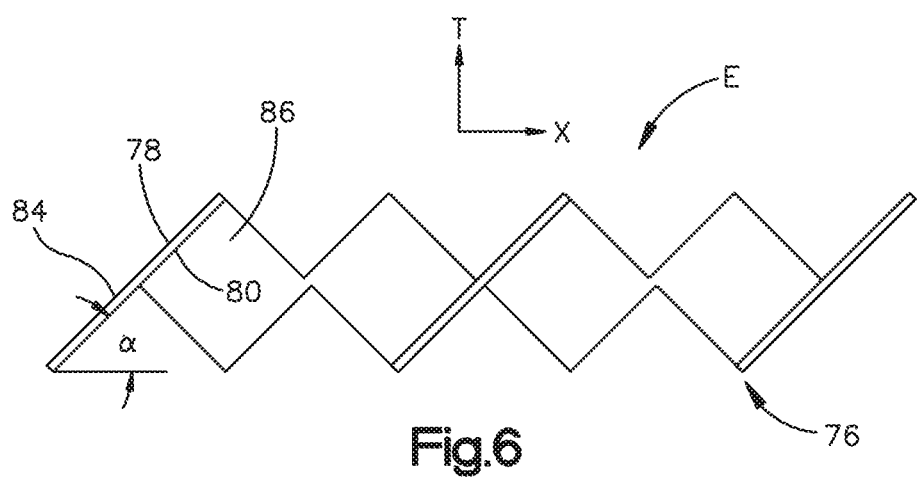
FIG. 6 shows a side sectional view of a portion of the mesh of FIG. 5 in the substantially uniformly expanded configuration.
Figure 7:
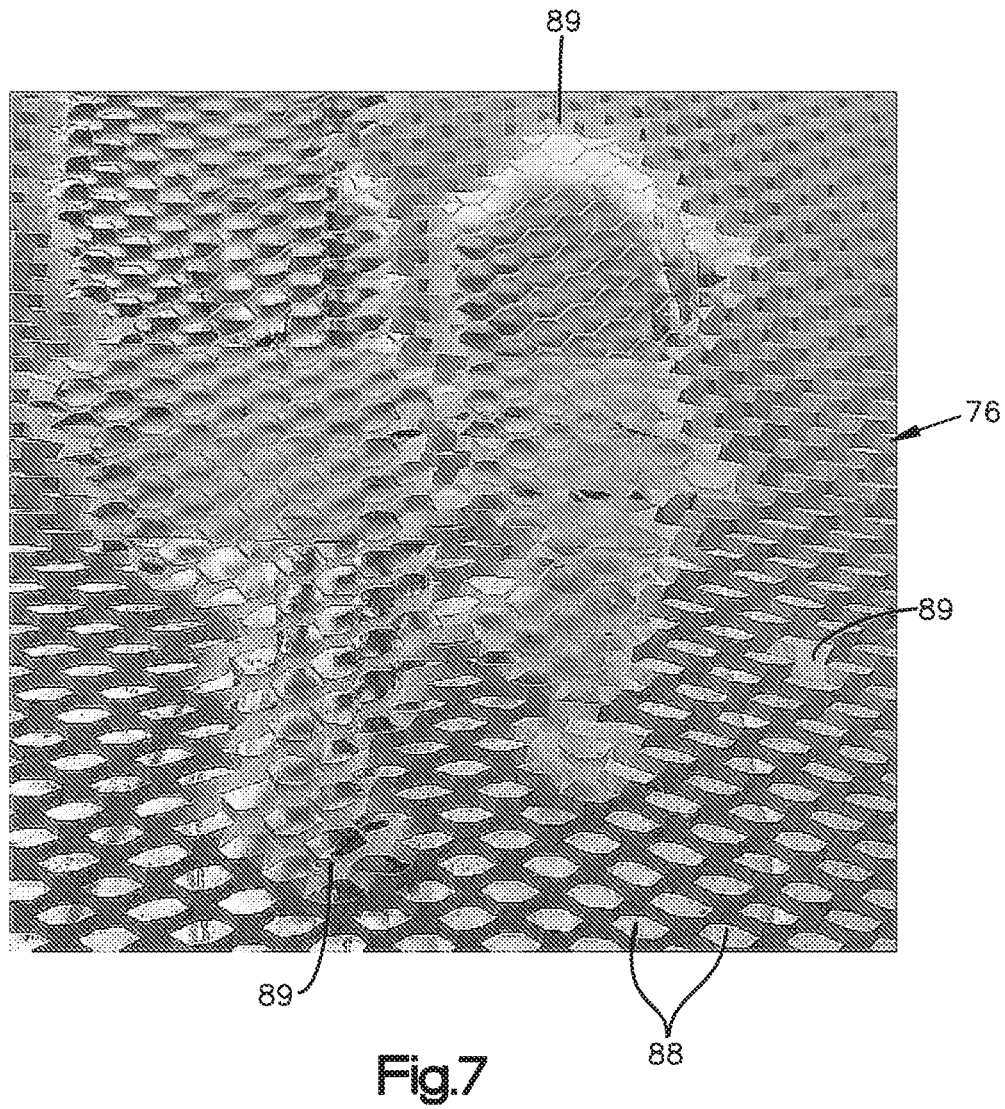
FIG. 7 is a photographic presentation of a portion of mesh material in a non-uniformly expanded configuration.

Referring now to FIG. 6, as the mesh 76 transitions to the expanded configuration E, the top and bottom surfaces 78, 80 of the nodes 84 individually rotate to an expanded orientation at an oblique angle α with respect to the direction of conveyance X. This rotation of the nodes 84 commences when a sufficient amount of tension (referred to herein as the "expansion tension") is applied to the mesh along the direction of conveyance X. Preferably, during expansion, all of the nodes 84 rotate in the same direction so that all of the nodes 84 are be substantially parallel with each other in the expanded configuration E. This results provides uniform expansion of the mesh 76 into the honeycomb structure. However, as shown in FIG. 7, in actuality the mesh 76 has a tendency to expand in a non-uniform manner, whereby at inflection points 89 some groups of adjacent nodes 84 rotate in an opposite direction during mesh expansion. The inventors have observed that it is extremely difficult to achieve uniform expansion of the mesh 76. This is at least partially a result of imperfections in the paper and minor variances in the perforations 82 themselves. While all of the parameters that determine the direction of node rotation 84 are not entirely know, the inventors believe that the primary determining factor involves the relative positions of the paper mesh 76 (and the fibers thereof) at the leading and trailing sides of each perforation 82. It has been observed that, without conditioning or otherwise preparing the mesh 76 for uniform expansion, the fibers on the leading side of a perforation 82 are in close contact with, and can even become intertwined, tangled, or otherwise intermingled with, fibers on the trailing side of the perforation. Additionally, absent conditioning, the paper mesh 76 portions (and fibers) on the leading and trailing sides of each perforation 82 are also at substantially the same elevation, as discussed in more detail below. Without being tied to any particular theory, the inventors believe that the direction in which each node 84 rotates is determined primarily by the relative elevations of the paper mesh 76 and/or the fibers on the leading and trailing sides of the perforations 82 that define the bounds of the respective node 84.

Figure 8:
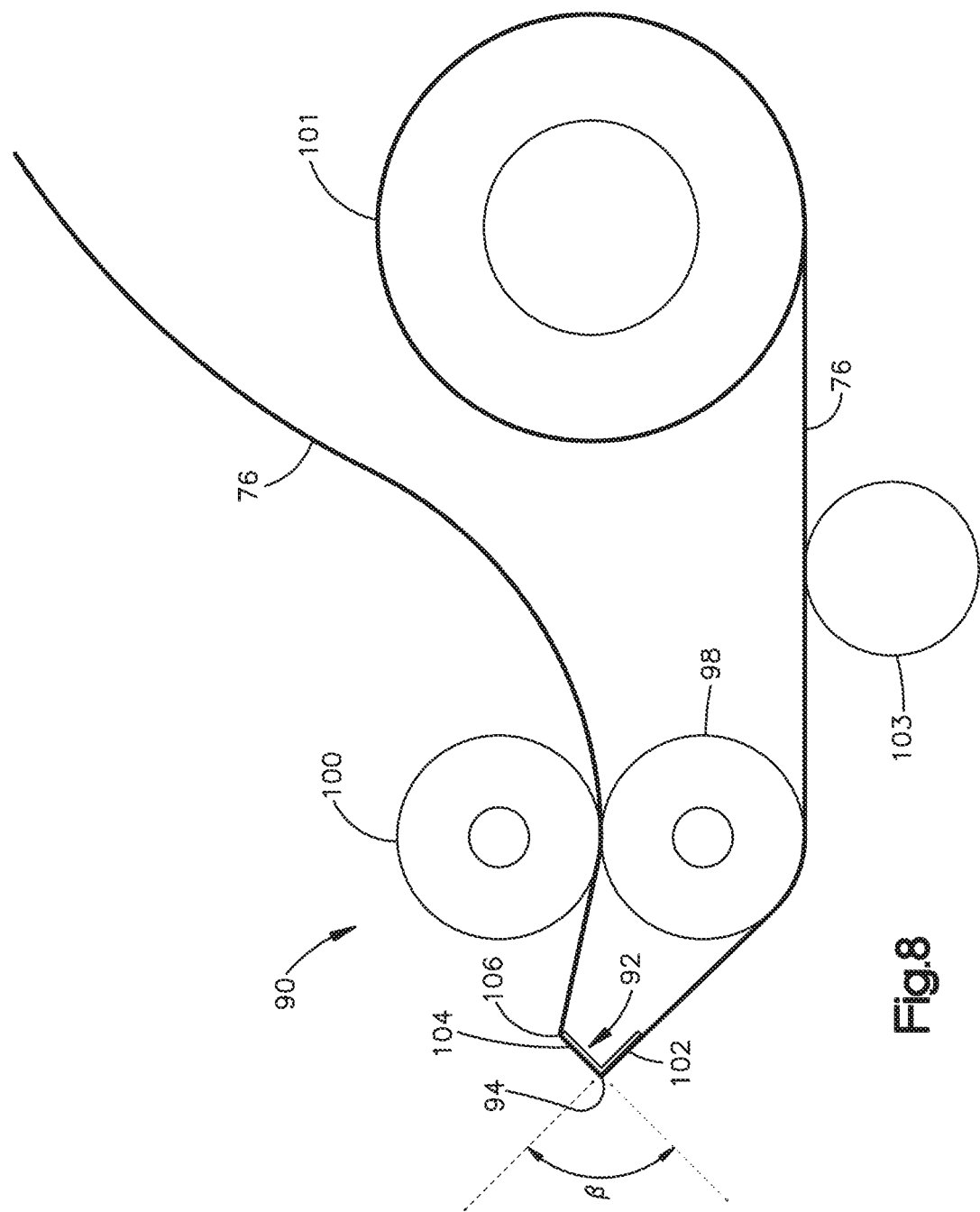
FIG. 8 shows a side plan view of an assembly for pre-conditioning the mesh material for uniform expansion, according to an embodiment of the present disclosure.

Referring now to FIG. 8, a pre-expansion conditioning assembly 90 can be employed in the supply zone 4 of FIG. 1 for condition the mesh 76 to expand uniformly. The conditioning assembly 90 includes an engagement element, such as a scraper 92, having at least one rigid edge 94. The scraper 92 can be carried by a support rack on a distal side of a pair of nip rollers. The nip rollers can include a first or lower nip roller 98 and a second or upper nip roller 100 that are vertically aligned with one another. In the direction of conveyance X, the mesh 76 can be fed (unspooled) from a roll 101 and conveyed to engagement with a bottom of the lower nip roller 98, and drawn under tension across the rigid edge 94 of the scraper 92 in a manner conditioning the perforations 82 for uniform expansion, as set forth in more detail below. From the rigid edge 94, the mesh 76 can be redirected back toward the nip rollers 98, 100. The mesh 76 can then the pinched between the nip rollers 98, 100 and conveyed downstream in the initial (unexpanded) configuration I. The mesh 76 can be redirected by the scraper 92 a total of at least about 90 degrees, and preferably at least about 180 degrees, from the bottom of the lower nip roller 98 to between the lower and upper nip rollers 98, 100. The mesh 76 can then be conveyed to an expansion mechanism, or can optionally be spooled onto a roll, such as the center roll 72 of FIG. 1, for subsequent storage and/or use. The mesh 76 is conveyed through the conditioning assembly 90 at a tension preferably less than the expansion tension. The nip rollers 98, 100 are configured to provide a sufficient amount of friction at the contact points with the mesh 76 so as to prevent the mesh 76 from wrinkling or bunching as the mesh 76 is drawn across the rigid edge 94. It is to be appreciated that supply roll 101 can be the center roll 72 carrying pre-perforated paper. In other embodiments, supply roll 101 can carry unperforated paper, in which embodiments the conditioning assembly 90 includes a cutting device, such as a cutting roller 103 or other type of perforation-forming device, positioned downstream of the supply roll 101 and upstream of the nip rollers 98, 100.

The scraper 92 can define a first surface 102 on the upstream side and a second surface 104 on the downstream side of the rigid edge 94. The first and second surfaces 102, 104 can be oriented with respect to each other so as to provide the rigid edge 94 with an apex angle β in the range of about 110 degrees and about 60 degrees. As illustrated, the scraper 92 can optionally comprise an L-bracket having an apex angle β of about 90 degrees. The first surface 102 can be oriented, shaped, or otherwise configured so as to provide a relief angle or space between itself and the mesh 76 approaching the rigid edge 94. A terminal edge of the second surface 104 of the scraper 92 can preferably define a second rigid edge 106 over which the mesh 76 is drawn. One or both of the rigid edges 94, 106 can be sharpened, and the first and second surfaces 102, 104 can be polished so as to reduce the surface finish roughnesses thereof. In this manner, the scraper 92 can provide more precise scraping effects at the first and second rigid edges 94, 106.

Figure 9:
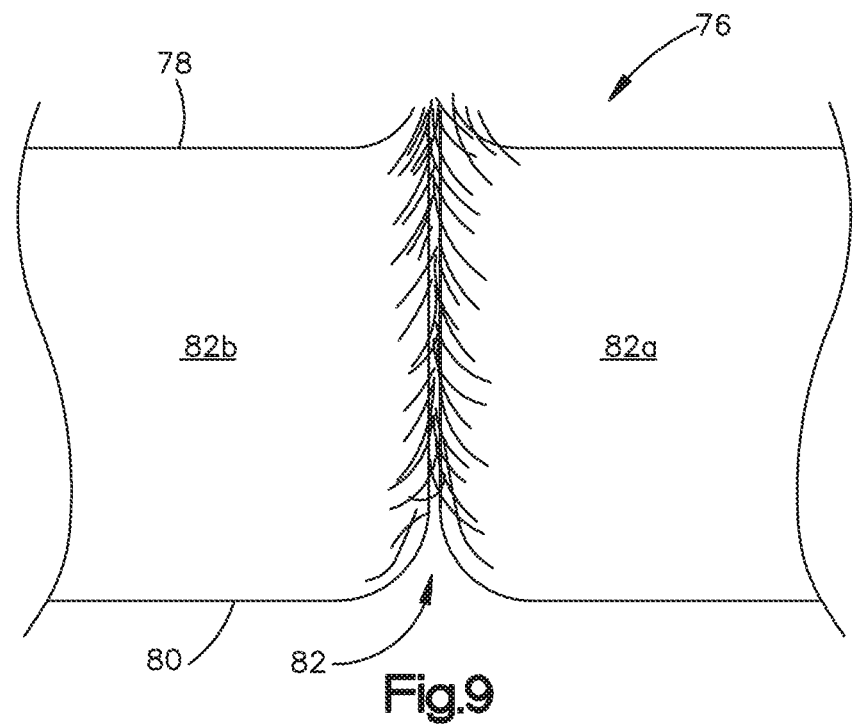
FIG. 9 shows a side elevation view of a perforation in the mesh prior to pre-conditioning with the assembly of FIG. 8.

The inventors have discovered that drawing the mesh 76 across the rigid edges 94, 106 in the manner shown results in substantially uniform expansion of the mesh 76 when the expansion tension is subsequently applied. Referring now to FIG. 9, the inventors have observed that, without conditioning the mesh 76 via the rigid edges 94, 106, the paper and/or fibers thereof extend upward into the perforation 82 from the bottom surface 80 to the top surface 78 of the mesh 76. Because the perforations 82 in the illustrated embodiments are formed by cutting (i.e., "punching") without removing paper material therefrom, the perforations 82 can be characterized as "zero-kerf" perforations 82. At the top surface 78, the fibers extending from both the leading and trailing sides 82a, 82b of the perforation 82 extend generally upwards and are in close contact. The fibers on the leading and trailing sides 82a, 82b can also become intermingled or intertwined. Additionally, the paper (and the fibers thereof) at the leading and trailing sides 82a, 82b of the perforation are generally at the same elevation.

Figure 10:
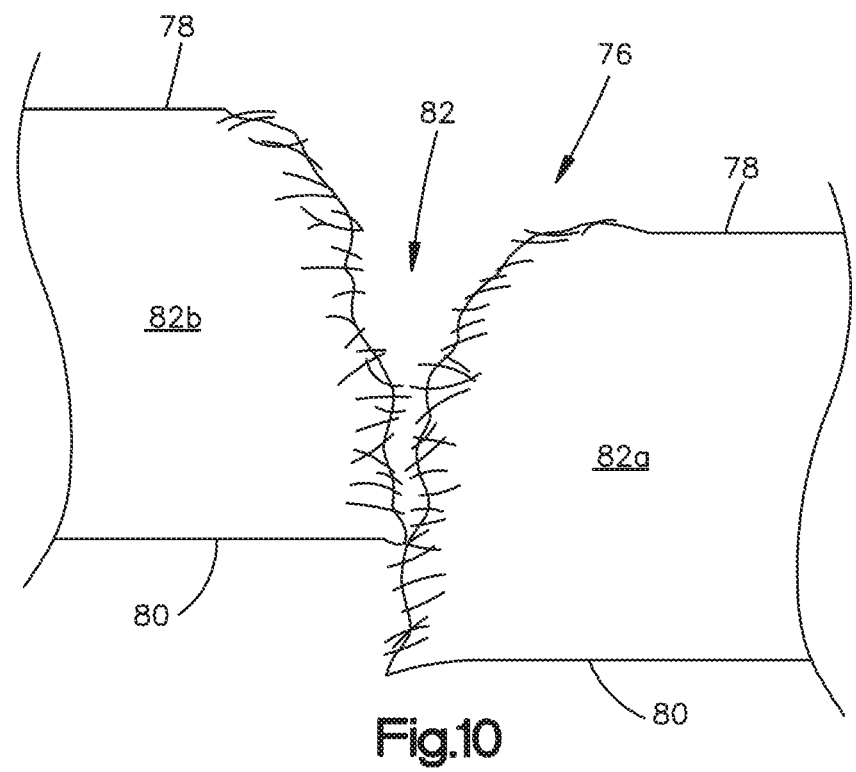
FIG. 10 shows a side elevation view of the perforation in the mesh after pre-conditioning with the assembly of FIG. 8.

However, as the perforations 82 traverse the rigid edge 94, the perforations 82 expand marginally while, concurrently, the mesh material on the downstream side of the edge 94 (i.e., the leading side 82a of the perforation 82) folds or otherwise "drops" to an extent with respect to the mesh material on the upstream side of the rigid edge 94 (i.e., the trailing side 82b of the perforation 82). Referring now to FIG. 10, a portion of the mesh 76 is shown after being conditioned by the scraper 92. In particular, scraping the lower surface 80 of the mesh 76 across the rigid edges 94, 106 causes the mesh material (and the fibers thereof) on the leading side 82a to effectively drop to a lower elevation (i.e., toward the surface of the mesh 76 engaged by the scraper 92, which in this embodiment is the lower surface 80) than the mesh material (and the fibers thereof) on the trailing side 82b. This also can result in untwining or unmingling of the fibers between the leading and trailing sides 82a, 82b of the perforation, further unencumbering expansion of the perforation 82. In this manner, the conditioning assembly 90 causes the leading side 82a of each perforation 82 in the mesh 76 to have a lower average elevation than the average elevation of the respective trailing side 82b. It is believed that this elevational differentiation at the perforations 82—in a generally uniform manner throughout the mesh 76—is the primary factor that results in substantially uniform expansion of the perforations 82 in the mesh 76.

Referring now to FIG. 11, the roll configuration shown in the supply zone 4 of FIG. 1 can include the bottom and top rolls 70, 74 and the center roll 72 carrying the mesh 76. The center roll 72 is positioned upstream of the bottom and top rolls 70, 74. In the embodiment shown in FIG. 11, the mesh 76 has already been conditioned for uniform expansion in the conditioning assembly 90 prior to spooling on the center roll 72. The outer liner 71 and inner liner 75 are unspooled from the bottom and top rolls 70, 74, respectively, and conveyed in the direction of conveyance X. The mesh 76 is unspooled from the center roll 72 and conveyed to an expansion mechanism 110 that expands the mesh 76 into the expanded configuration E. The expansion mechanism 110 stretches the mesh 74 along the direction of conveyance X so as to expand the mesh into the expanded configuration E. In some embodiments, this can be accomplished simply by conveying the mesh 76 at a linear feed rate higher than that at which the liners 71, 75 are conveyed. Although the expansion mechanism 110 is shown upstream of the liner rolls 70, 74, it is to be appreciated that the expansion mechanism 110 can optionally be positioned downstream of the liner rolls 70, 74.

With continued reference to FIG. 11, the expanded mesh 76 is conveyed between the outer and inner liners 71, 75 (i.e., over the outer liner 71 and underneath the inner liner 75) along the direction of conveyance X. The expanded mesh 76 and the liners 71, 75 are conveyed to a laminating mechanism 112 that attaches the expanded mesh 76 to the liners 71, 75 to form the laminate 12. In particular, the laminating mechanism 112 can attach the outer liner 71 to the bottom surfaces of at least some of the nodes 84, and also attach the inner liner 75 to the top surfaces of at least some of the nodes 84 in the mesh 76. The laminating mechanism 112 can attach the mesh 76 to the liners 71, 75 with one or more adhesives applied in a pattern or in a film-like manner to the interior-facing surfaces of the liners 71, 75. Other laminating techniques are also within the scope of the present disclosure. It is also to be appreciated that the expansion mechanism 110 can optionally be located adjacent or within the laminating mechanism 112. The laminate 12 exits the laminating mechanism 112 and is conveyed along the direction of conveyance X toward the induction zone 4.

When the mesh 76 and liners 71, 75 each consist of paper packaging materials and the adhesives are also paper-recyclable, the entire package 19 can be curbside recyclable (i.e., the entire package 19 is capable of being recycled in a recycling facility and/or in a recycling process available to the public through most municipal recycling programs).

Figure 12:
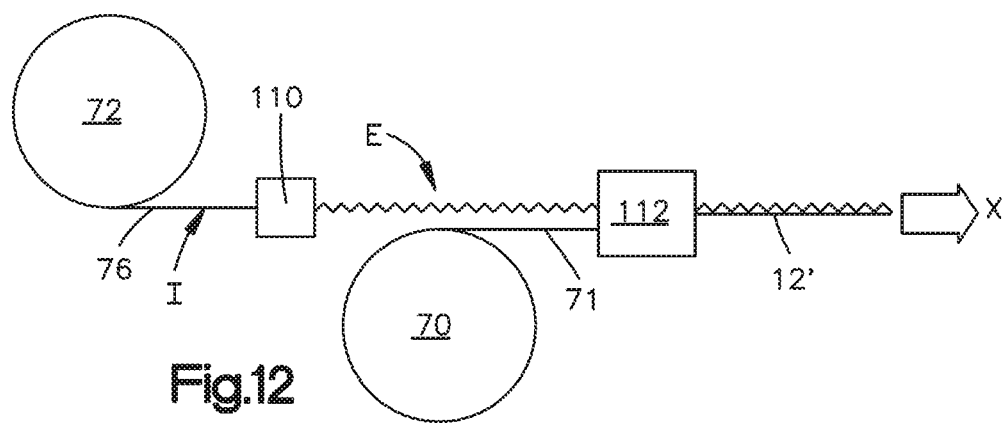
FIG. 12 shows a side plan view of another embodiment of a sub-assembly for preparing a laminated packaging material for use with the automated packaging system of FIG. 1.

Referring now to FIG. 12, the roll configuration in the supply zone 4 can include the bottom liner roll 70 and the center roll 72 carrying the mesh 76, but can omit the inner liner roll 74. Accordingly, in this embodiment, the laminate 12' has a single liner 71. When the laminate 12' reaches the induction zone 8, the bucket 20 deposits items 14 directly onto the mesh 76 portion of the laminate 12. In this embodiment, the adhesive layers 46, 50 can be applied directly to an interior (i.e., the upper facing) surface of the bottom liner 71 at the lateral edges 48, 52 thereof. The lateral edges 48, 52 of the liner 71 can extend laterally outward from the lateral edges of the mesh 76. Thus, the adhesive layers 46, 50 can be applied in the respective spaces between the lateral edges of the mesh 76 and the lateral edges 48, 52 of the liner 71. Alternatively, the adhesive layers 46, 50 for sealing the package 19 can be applied to as to contact the liner 71 and the mesh 76.

Figure 13:
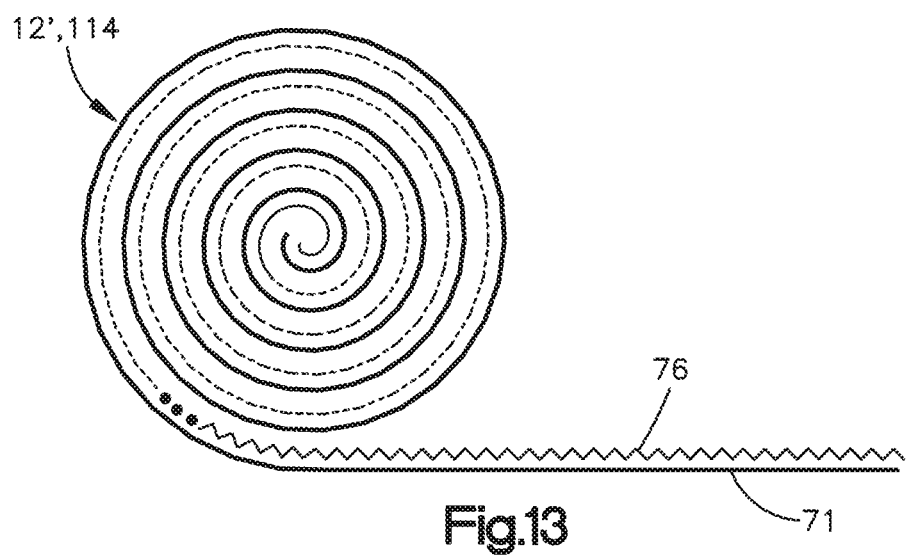
FIG. 13 shows a side plan view of a roll of laminated packaging material for use with the automated packaging system of FIG. 1, according to another embodiment of the present disclosure.

One advantage of the present embodiment is that, instead of conveying the laminate 12' to the induction zone 8, the laminate 12' can optionally be spooled onto its own roll 114, as shown in FIG. 13. In further such embodiments, the roll configuration of the supply zone 4 can include a single roll 114 of the laminate 12', or can optionally include the second liner 74 for subsequent attachment to the laminate 12' to form the reinforced laminate 12.

In further embodiments, the laminate 12 can include a first paper liner, a layer of reinforcement fibers disposed over the first paper liner, a layer of thermoplastic material (such as LDPE and/or HDPE, for example) disposed over the layer of reinforcement fibers, and a second paper liner comprising a custom paper laminated with the thermoplastic layer. The thermoplastic layer can be a type that is configured to bond with the second paper liner, for example by thermal activation such as heat and pressure, or friction welding. The thermoplastic layer can be configured so that the packages 19 formed in the present embodiment can be paper curbside recyclable. For example, the thermoplastic can be utilized in a sufficiently low volume and the thermoplastic resin can be modified, such as with additives, to allow easier breakdown in a paper repulping process.

Figure 14:
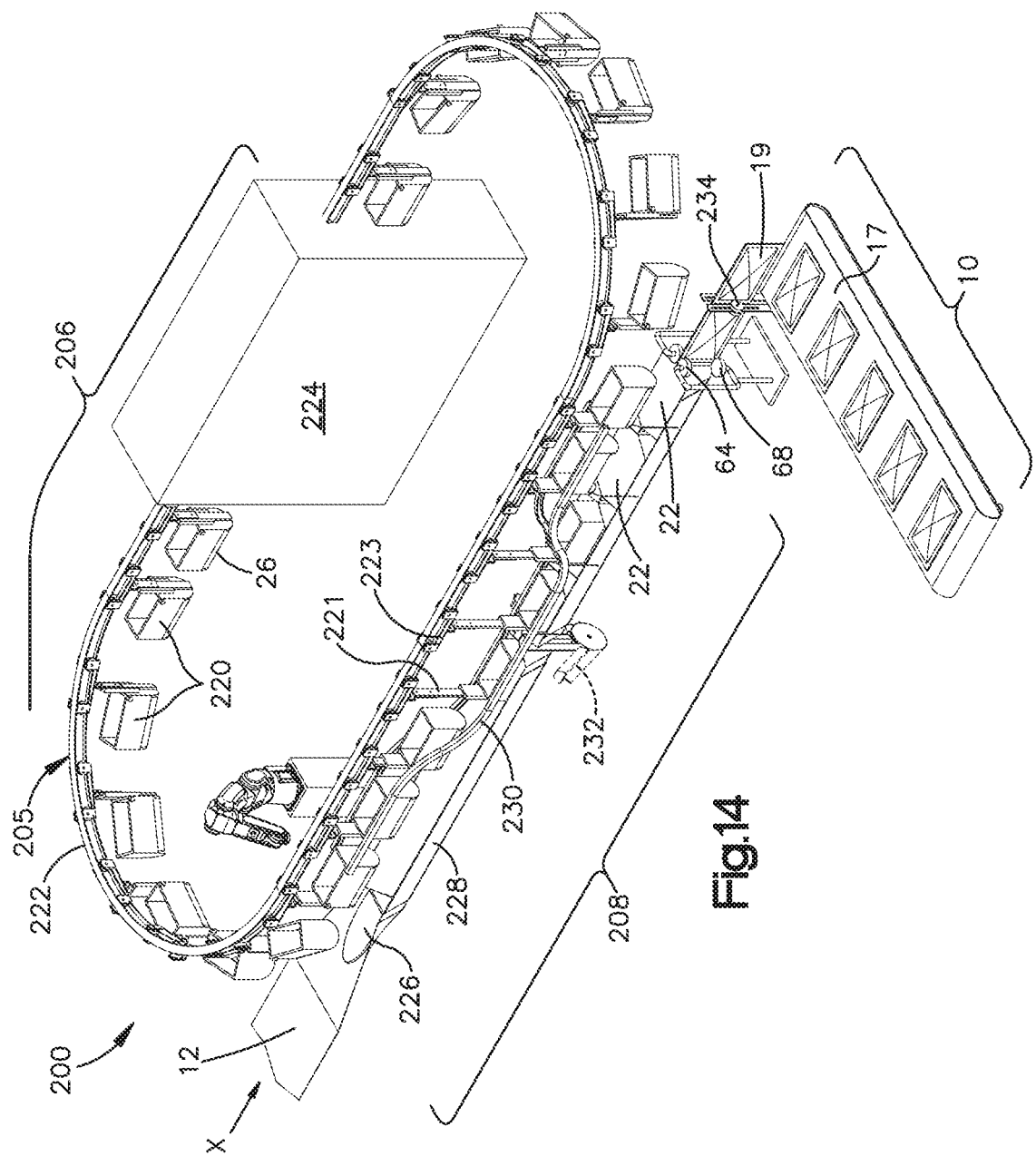
FIG. 14 shows a perspective view of an automated packaging system, according to another embodiment of the present disclosure.

Referring now to FIG. 14, another embodiment of an automated packaging system 200 is shown. In this embodiment, the item supply zone 206 can flow along a portion of the laminate 12, which can be configured according to any of the laminate embodiments described above. The system 200 can include a container conveyance system, such as a carousel 205, that carries a plurality of buckets 220 along a track 222. The buckets 220 can each be coupled via one or more extendable arms 221 to a carriage 223 that rides along the track 222. The buckets 220 can be directed through an item filling station 224, at which incoming orders of items 14 can be segregated into the buckets 220 that are then conveyed to an induction zone 208 for packaging the items 14. At the induction zone, the laminate 12 can be impinged against a shaping element, such as a trough-shaping wedge 226, and thereafter conveyed along the direction of conveyance X to an induction trough 228. The carousel 205 is preferably configured to convey the buckets 220 in the induction zone 208 along the direction of conveyance at the same speed as the laminate 12.

The system 200 can include a secondary induction track 230 that guides one or more followers on each bucket 220 downward to an induction position in which the buckets 220 are positioned within the trough 228. A sealing device, such as a pinch-press 232, can seal the leading and trailing edges of the laminate 12 around the bucket 220 so as to define a packaging volume of a package segment 22 of the laminate 12. Subsequently, the bottom opening 26 of the bucket 220 can be opened so that the items therein are gravity-fed into the package segment 22, after which the secondary induction track 230 returns the bucket 200 to its raised position and the bucket 220 is redirected back to the filling station 224. The package segments 22 exit the induction trough 228 and are passed through a sealing element, such as sealing rollers 64, 68, which can be configured as described above with reference to FIG. 2. Subsequently, the package segments 22 are severed by a cutting device 234 into individual, sealed packages 19, which are then deposited onto the offloading mechanical conveyor line 17.

It should be noted that the illustrations and descriptions of the embodiments shown in the figures are for exemplary purposes only, and should not be construed limiting the disclosure. One skilled in the art will appreciate that the present disclosure contemplates various embodiments. Additionally, it should be understood that the concepts described above in connection with the respective above-described embodiments may be employed alone or in combination with any of the other embodiments described above. It should further be appreciated that the various alternative embodiments described above with respect to one illustrated embodiment can apply to all embodiments as described herein, unless otherwise indicated. Also, the present invention is not intended to be limited by any description of drawbacks or problems with any prior art device.

Unless explicitly stated otherwise, each numerical value and range should be interpreted as being approximate as if the word "about" or "approximately" preceded the value or range.

It should be understood that the steps of exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

What is claimed is:

1. A method of packaging items, comprising:
    unspooling a mesh from a roll of paper mesh material, the mesh having a top surface, a bottom surface, and a plurality of perforations that extend from the top surface to the bottom surface and define within the mesh a plurality of legs interconnecting a plurality of nodes;
    unspooling a first liner layer from a first roll of liner material;
    unspooling a second liner layer from a second roll of liner material;
    conveying the mesh against a rigid edge in a manner causing, at substantially each perforation, a first portion of the mesh on a leading side of the perforation to have an average elevation lower than an average elevation of a second portion of the mesh on a trailing side of the perforation;
    stretching the mesh along a direction of conveyance, comprising:
        expanding the plurality of perforations along the direction of conveyance into a plurality of hexagonal cells separated from one another by the pluralities of legs and nodes; and
        reorienting top and bottom surfaces of the pluralities of legs and nodes from an initial orientation substantially parallel with the direction of conveyance to an expanded orientation oblique to the direction of conveyance, wherein, in the expanded orientation, the top surfaces of substantially all of the nodes are substantially parallel;
    attaching the first liner layer to the bottom surface of the mesh and attaching the second liner layer to the top surface of the mesh so as to form a belt of cushioned packaging material;
    conveying the belt to an induction zone;
    lowering a bucket onto the belt in the induction zone so that the belt conforms substantially around a periphery of the bucket so as to define a package segment of the belt;
    conveying containers carrying items to the induction zone;
    inducting a subset of the items into the bucket;
    opening a bottom of the bucket;
    retracting the bucket so that the subset of items is disposed within the package segment; and
    sealing at least two edges of the package segment so as to define a package at least partially enclosing the subset of items therein.

2. The method of claim 1, further comprising repositioning items in the induction zone with an item repositioning device.

3. The method of claim 1, further comprising applying one or more layers of adhesive to an exterior surface of the second liner layer prior to the sealing step, wherein the sealing step comprises sealing one or more edges of the package segment via the adhesive.

4. The method of claim 1, further comprising sealing one or more unsealed edges of the package so as to enclose the subset of items in the package, and severing the package from the belt.

5. A method of preparing a packaging laminate, the method comprising:
    conveying a mesh of paper material having perforations against a rigid edge in a manner causing, at substantially each perforation, a first portion of the mesh on a leading side of the perforation to have an average elevation lower than an average elevation of a second portion of the mesh on a trailing side of the perforation;
    expanding the perforations into a plurality of cells separated from one another by a plurality of legs interconnected by a plurality of nodes defined in the mesh by the perforations;
    reorienting top and bottom surfaces of the pluralities of legs and nodes from an initial orientation substantially parallel with a direction of conveyance of the mesh to an expanded orientation oblique to the direction of conveyance, wherein, in the expanded orientation, the top surfaces of the nodes are substantially parallel with each other; and attaching an outer liner to at least some of the nodes so as to form the packaging laminate.

6. The method of claim 5, wherein the conveying step comprises redirecting the mesh by at least 90 degrees with the rigid edge, and the method further comprises conveying the mesh against a second rigid edge.

7. The method of claim 5, further comprising pinching the mesh between a pair of nip rollers downstream of the rigid edge.

8. The method of claim 7, further comprising engaging the mesh against one of the nip rollers upstream of the rigid edge.

9. The method of claim 5, wherein the conveying step comprises unspooling the mesh from a roll of paper mesh material, and the method further comprises, prior to attaching the outer liner, unspooling the outer liner from a roll of liner material and conveying the outer liner underneath the mesh in the direction of conveyance.

10. The method of claim 9, further comprising attaching an inner liner to at least some of the nodes so as to reinforce the packaging laminate.

11. The method of claim 10, further comprising, prior to attaching the inner liner, unspooling the inner liner from another roll of liner material and conveying the inner liner over the mesh in the direction of conveyance.

12. The method of claim 5, further comprising spooling the packaging laminate onto a spool for subsequent packaging of items with the packaging laminate.

13. The method of claim 5, further comprising:
conveying the packaging laminate to an induction zone;
lowering a bucket onto the packaging laminate in the induction zone so that the packaging laminate conforms substantially around a periphery of the bucket so as to define a package segment of the packaging laminate;
inducting one or more items into the bucket;
opening a bottom of the bucket; and
retracting the bucket so that the one or more items is disposed within the package segment.

14. The method of claim 13, further comprising:
sealing first and second lateral edges of the package segment;
sealing a top edge of the package segment so as define a package enclosing the one or more items; and
severing the package from the packaging laminate.

15. The method of claim 14, further comprising, prior to the inducting step, depositing the one or more items into one or more containers and conveying the one or more containers to the induction zone via a mechanical conveyor line.

16. The method of claim 14, further comprising offloading the package onto a mechanical conveyor line, and delivering the package toward a package sorting destination via the mechanical conveyor line.

17. The method of claim 14, further comprising, prior to the sealing steps, applying first and second layers of adhesive to an interior surface of the outer liner at the first and second lateral edges, respectively, wherein the sealing steps comprise:
pressing the first layer of adhesive against an opposed portion of the first lateral edge with a first sealing element; and
pressing the second layer of adhesive against an opposed portion of the second lateral edge with a second sealing element.

18. The method of claim 17, wherein the first and second sealing elements comprise one or more of rollers and bars.

19. The method of claim 18, wherein the applying steps are performed within the induction zone before the lowering step.

20. The method of claim 5, further comprising repositioning one or more of the one or more items within the induction zone with a repositioning device.

* * * * *